US009001841B2

(12) United States Patent
Nagatsuka

(10) Patent No.: US 9,001,841 B2
(45) Date of Patent: Apr. 7, 2015

(54) COMMUNICATION CONTROL DEVICE, PARALLEL COMPUTER SYSTEM, AND COMMUNICATION CONTROL METHOD

(71) Applicant: Fujitsu Limited, Kawasaki-shi (JP)

(72) Inventor: Masaaki Nagatsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 101 days.

(21) Appl. No.: 13/656,839

(22) Filed: Oct. 22, 2012

(65) Prior Publication Data

US 2013/0163608 A1 Jun. 27, 2013

(30) Foreign Application Priority Data

Dec. 27, 2011 (JP) ................................ 2011-285709

(51) Int. Cl.

| | |
|---|---|
| ***H04L 12/56*** | (2006.01) |
| ***G06F 13/36*** | (2006.01) |
| ***H04L 12/00*** | (2006.01) |
| ***H04L 12/413*** | (2006.01) |

(52) U.S. Cl.

CPC ................ *G06F 13/36* (2013.01); *H04L 12/00* (2013.01); *H04L 12/413* (2013.01)

(58) Field of Classification Search

CPC .............................. H04L 12/413; H04L 12/00
USPC ........... 370/397, 412, 414, 235, 461; 709/238
See application file for complete search history.

(56) References Cited

U.S. PATENT DOCUMENTS 5,930,256 A * 7/1999 Greene et al. ................. 370/397
6,539,025 B1 * 3/2003 Manning et al. .............. 370/414
7,532,629 B2 * 5/2009 Ebata ........................... 709/238
7,983,170 B2 * 7/2011 Jackowski et al. ............ 370/237
2002/0080808 A1 * 6/2002 Leung .......................... 370/412
2003/0174652 A1 9/2003 Ebata
2003/0185155 A1 * 10/2003 Huang et al. .................. 370/235
2004/0022263 A1 * 2/2004 Zhao et al. .................... 370/461
2004/0114516 A1 * 6/2004 Iwata et al. ................ 370/230.1
2005/0286488 A1 * 12/2005 Briscoe et al. ............... 370/351
2006/0109864 A1 * 5/2006 Oksman ........................ 370/474
2007/0118677 A1 * 5/2007 Swartzentruber et al. .... 710/316
2007/0174529 A1 * 7/2007 Rodriguez et al. ............ 710/240
2012/0030451 A1 * 2/2012 Pong et al. .................... 712/223
2012/0095728 A1 * 4/2012 Ubukata ........................ 702/186
2012/0320751 A1 * 12/2012 Zhu .............................. 370/236

FOREIGN PATENT DOCUMENTS

JP 2001-326648 11/2001
JP 2003-273788 9/2003
WO WO2009147731 A1 * 12/2009 .......... H04L 47/6215

* cited by examiner

*Primary Examiner* — Khaled Kassim
*Assistant Examiner* — Parth Patel
(74) *Attorney, Agent, or Firm* — Staas & Halsey LLP

(57) ABSTRACT

A communication control device includes a plurality of inputting units to which a packet is inputted a plurality of outputting units to which the packet is outputted a selector that selects an output packet to output from an identical outputting unit among a plurality of conflict packets having the identical outputting unit as a destination, the plurality of conflict packets being selected among a plurality of packets inputted to the plurality of inputting units, based on priority information set in each conflict packet and a processing unit that updates the respective priority information of unselected packets not selected as the output packet by the selector among the plurality of conflict packets based on weighting information in accordance with a packet size.

5 Claims, 11 Drawing Sheets

20
21
OUTPUT PORT ARBITRATION UNIT
22
ARBITRATION RESULT
{In1,In2,In3,In4,In5}
24-1, 24
24-2, 24
24-3, 24
24-4, 24
24-5, 24
23-1, 23
23-2, 23
23-3, 23
23-4, 23
23-5, 23
231
25
{P1,S1,D1}
{P2,S2,D2}
{P3,S3,D3}
{P4,S4,D4}
{P5,S5,D5}
Sn1
Sn2
Sn3
Sn4
Sn5
S1 P1 D1
S2 P2 D2
S3 P3 D3
S4 P4 D4
S5 P5 D5

20
101-1
101-2
101-3
101-4
102
103
104
106
107
108
SENDING CONTROLLER
RECEIVING CONTROLLER
110
111
112
113
114
115
116
220

23-1, 23
PACKET INFORMATION
REG_P
REG_D
REG_S
PRIORITY INCREMENTS
REG_SI
23-2, 23
PACKET INFORMATION
REG_P
REG_D
REG_S
PRIORITY INCREMENTS
REG_SI
23-5, 23
PACKET INFORMATION
REG_P
REG_D
REG_S
PRIORITY INCREMENTS
REG_SI
PRIORITY
DESTINATION
ARBITRATION RESULT
211
ARBITRATOR WITH PRIORITY
212
21
ARBITRATION RESULT
TO DATA CROSSBAR SWITCH

20
OUTPUT PORT
24-1, 24
24-2, 24
24-3, 24
24-4, 24
24-5, 24
INCREASE PRIORITY COUNTER OF PACKET TO BE KEPT WAITING BY PACKET SIZE SELECTED BY ARBITRATION
INPUT PORT
PRIORITY COUNTER P1 + S2
PACKET SIZE S1
PRIORITY COUNTER P3 + S2
PACKET SIZE S3
231
231
231
231
23-1, 23
23-2, 23
23-3, 23
23-4, 23
23-5, 23

300
310
311
312
313
314
315
316
317
N0
N1
N2
N3
N4
N5
N6
N7
1/64
1/32
1/16
1/8
1/4
1/2
NUMBER OF PACKETS
PACKET SIZE RATIO
COMMUNICATION BANDWIDTH RATIO
SWITCH
NODE

COMMUNICATION CONTROL DEVICE, PARALLEL COMPUTER SYSTEM, AND COMMUNICATION CONTROL METHOD

CROSS-REFERENCE TO RELATED APPLICATION

This application is based upon and claims the benefit of priority of the prior Japanese Patent Application No. 2011-285709, filed on Dec. 27, 2011, the entire contents of which are incorporated herein by reference.

FIELD

The embodiments discussed herein are related to a communication control device, a parallel computer system, and a communication control method.

BACKGROUND

Conventionally, there is a parallel computer provided with a plurality of nodes that carries out arithmetic processing. The nodes provided in the parallel computer are connected via a network including a plurality of communication equipments, routing devices (for example, switches), and the like and carry out data communication to each other.

FIG. 10 is a drawing illustrating a configuration example of a parallel computer 300.

The parallel computer 300 illustrated in FIG. 10 is provided with nodes N0 through N7 that carry out calculation and switches 310 through 317 that transfer received data to a specific destination node. The switches 310 through 317 configure a one dimensional meshed network that has the switches arranged on a straight line.

As such a switch receives a packet from an input port connected to the nodes and other switches, it determines an output port to output the packet based on destination information included in the received packet. Then, the switch outputs the packet to the determined output port.

In a case of receiving a plurality of packets to output to a same output port, the switch carries out arbitration such that a number of packets outputted from each input port to the output ports become equal. Then, the switch sends the packets from the output ports in accordance with the arbitration result.

In relation to the above technique, there is a wireless multihop network including a sending node that determines a packet size in accordance with a hop count, which is a number of transfer to the destination, to carry out fragmentation that fragments sending data into packets in a smaller size and a relay node that sends a packet by priority control in accordance with the hop count.

In addition, there is a wireless data communication method that carries out efficient communication at any time by defining a length of the next packet based on a length of a packet that has completed communication.

Japanese Laid-open Patent Publication No. 2003-273788 and Japanese Laid-open Patent Publication No. 2001-326648 are examples of related art.

In the parallel computer 300 described above, when communication is focused on a part of the switches by carrying out group communication between the nodes N0 through N7, a node having a larger hop count to the switch on which the communication is focused greatly decreases in the communication bandwidth. In this case, compared with data from a node having a smaller hop count, data arrival from a node having a larger hop count to a destination node is delayed.

FIG. 11 is a drawing illustrating an example of group communication in which the nodes N0 through N6 send data to the node N7.

In general, the switches carry out arbitration such that packets from each input port are outputted equally. In other words, the switches carry out arbitration of packets to be inputted such that a number of outputs, of the packets inputted to each input port, to output ports become equal, that is, become ½ each. Accordingly, a number of packets sent from the node N6 to the switch 316 and also sent from the switch 316 to the switch 317 becomes ½ of a total number of packets sent from the switch 316 to the switch 317.

In FIG. 11, a ratio of a number of packets sent by an arbitrary node to a number of packets sent to the node N7, in other words, a number of packets sent to the switch 317 is defined as “a packet number ratio”. In this case, the packet number ratio at the node N6 is ½.

A number of packets sent from the switch 315 to the switch 316 and also sent from the switch 316 to the switch 317 become ½ of the total number of packets sent from the switch 316 to the switch 317. Then, a number of packets sent from the node N5 to the switch 315 and also sent from the switch 315 to the switch 316 becomes ½ of the total number of packets sent from the switch 315 to the switch 316. Accordingly, the packet number ratio at the node N5 is ¼.

Similarly, the packet number ratios at the nodes N4, N3, N2, and N1 is ⅛, 1/16, 1/32, and 1/64, respectively.

Here, a ratio of a size of a packet sent by each node, which is an originator of group communication, is defined as “a packet size ratio”. In the group communication illustrated in FIG. 11, all nodes output packets in a similar size, so that the packet size ratio at the nodes N6, N5, N4, N3, N2, N1, and N0 is 1:1:1:1:1:1:1, respectively.

A ratio of a communication bandwidth used by an originating node to send a packet to the entire communication bandwidth is defined as “a communication bandwidth ratio”. In a case that all nodes output packets in a similar size, the packet number ratio at each node directly becomes the communication bandwidth ratio, so that the communication bandwidth ratios at the nodes N6, N5, N4, N3, N2, N1, and N0 becomes ½, ¼, ⅛, 1/16, 1/32, 1/64, and 1/64, respectively, where the entire bandwidth is 1.

In the example of group communication illustrated in FIG. 11, it is considered that the communication bandwidths of the nodes N0 and N1 that are far from the destination node N7 greatly decreases relative to the nodes N6 and N5 that are close to the destination node N7. Unless communication of all nodes is completed, group communication is not completed. Therefore, compared with the data from the node N6, which is close to the destination node N7, to the destination node N7, data arrival from the nodes N0 and N1 to the destination node N7 is delayed. In this case, the communication bandwidths of the nodes N0 and N1, which are far from the destination node N7, becomes a bottleneck. The data arrival from a node having a larger hop count to a destination node is delayed.

Even in communication other than group communication, when communication is focused on a part of switches, the communication bandwidth of a node having a larger hop count, which is a number of transfer to the switch on which the communication is focused, greatly decreases.

For example, in a network as illustrated in FIG. 11, in a state of 36 switches are connected in alignment in a row, the communication bandwidth of the node farthest from the destination node decreases to approximately 1/34.3 billion, which is a state practically difficult to take part in the communication.

As just explained, when communication is focused on a part of switches, such as in group communication, the communication bandwidth of a node having a larger hop count to the switch on which the communication is focused greatly decreases, so that the data arrival from the node having a larger hop count to the destination node is delayed. Therefore, depending on the magnitude of the hop count, a bias occurs in the data arrival time to the destination node.

SUMMARY

According to an aspect of the embodiments, an apparatus includes a communication control device including: a plurality of inputting units to which a packet is inputted a plurality of outputting units to which the packet is outputted a selector that selects an output packet to output from an identical outputting unit among a plurality of conflict packets having the identical outputting unit as a destination, the plurality of conflict packets being selected among a plurality of packets inputted to the plurality of inputting units, based on priority information set in each conflict packet and a processing unit that updates the respective priority information of unselected packets not selected as the output packet by the selector among the plurality of conflict packets based on weighting information in accordance with a packet size.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A description is given below to an embodiment according to the present communication control device, parallel computer system, and communication control method with reference to the drawings. It is noted that the embodiment described below is merely an example and is not intended to exclude a variety of modifications and technique applications not explicitly expressed in the embodiment. In other words, the present embodiment can be carried out by being variously modified not departing from the scope of the spirit.

Figure 1:
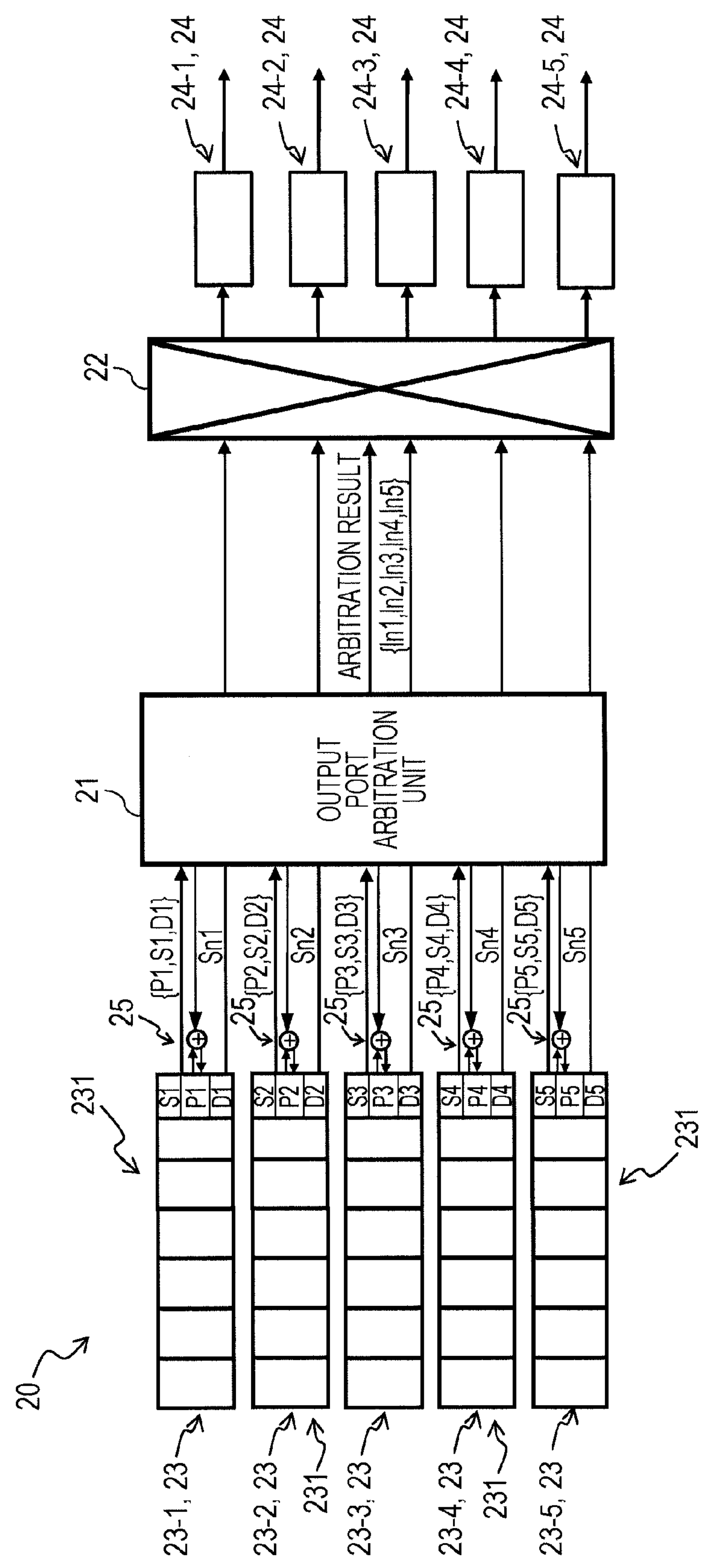
FIG. 1 is a drawing schematically illustrating a configuration of a switch as an example of an embodiment.
Figure 2:
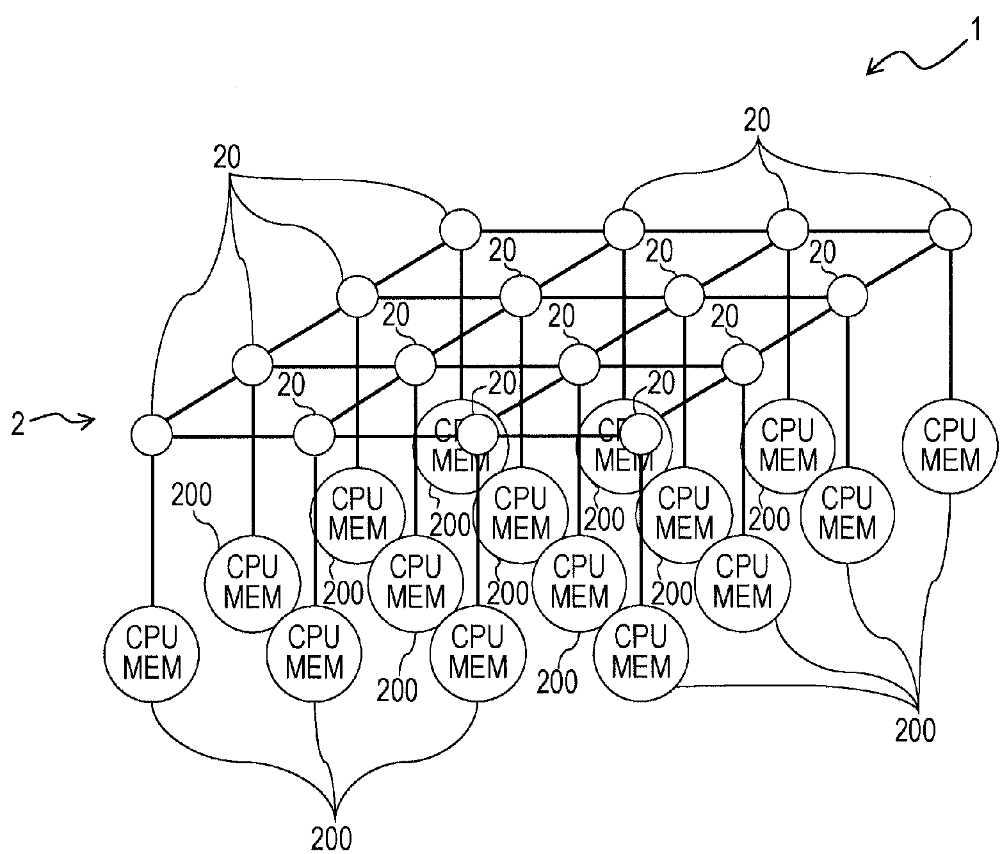
FIG. 2 is a drawing schematically illustrating a configuration of a parallel computer system provided with switches as an example of an embodiment.
Figure 3:
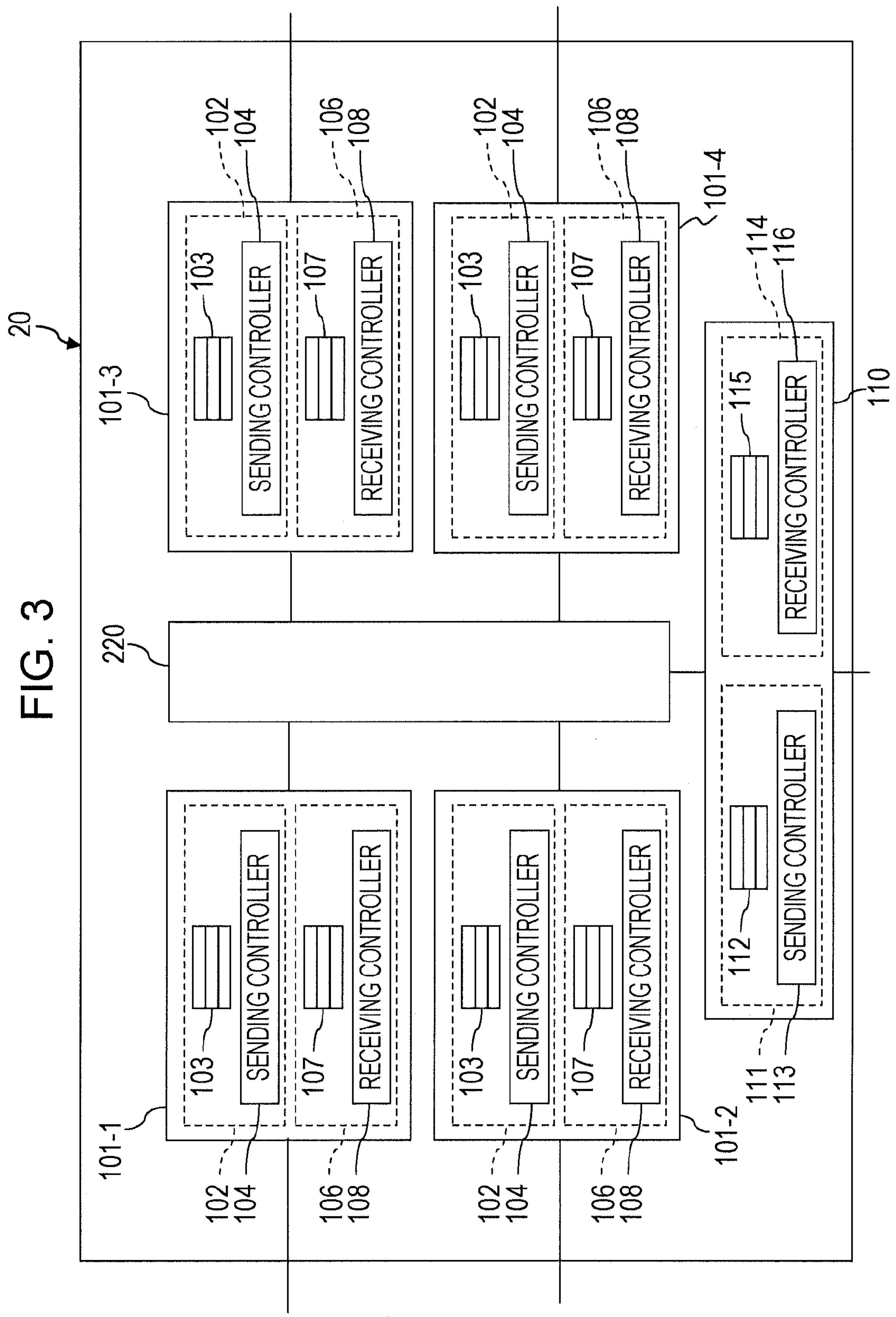
FIG. 3 is a drawing schematically illustrating a hardware configuration of a switch as an example of an embodiment.

FIG. 1 is a drawing schematically illustrating a configuration of a switch 20 as an example of an embodiment, FIG. 2 is a drawing schematically illustrating a configuration of a parallel computer system 1 provided with the switches 20, and FIG. 3 is a drawing schematically illustrating a hardware configuration of the switch 20.

The parallel computer system 1 is configured with, as illustrated in FIG. 2, an interconnection network that connects a plurality (16 in the example illustrated in FIG. 2) of calculation nodes 200 communicatively to each other via one or more (16 in the example illustrated in FIG. 2) routers (switching devices) 20.

In the example illustrated in FIG. 2, the routing devices (communication control devices) 20 are arranged respectively at respective grid point of a network 2 formed in a grid, and the calculation nodes 200 are connected respectively via the respective routing devices 20.

In the present embodiment, the plurality of calculation nodes 200 provided in the parallel computer system 1 is provided with a configuration similar to each other, and the plurality of routing devices 20 is also provided with a configuration similar to each other.

The calculation nodes 200 are connected communicatively to the routing devices 20 via interconnection network interfaces, not illustrated. This enables to send and receive a packet between the arbitrary calculation nodes 200 in the present parallel computer system 1.

In the present parallel computer system 1, data sent from each calculation node 200 is sent and received in a state divided into packets. A packet length of the packets can be set appropriately, and can be performed appropriately as a fixed length or a variable length.

The calculation node 200 is provided with a processor, not illustrated. This processor sequentially obtains packets held in a packet receiving circuit of the interconnection network interfaces, not illustrated, to carry out arithmetic processing. When it is desired to send data to another calculation node 200, the processor also generates packets including a destination address by dividing the data and outputs them via the interconnection network interface.

The routing device 20 is a relay device that is connected communicatively to the calculation node 200 and other routing devices 20 and sends the received packets (data) to a transfer destination. As the routing device 20, a switch is used, for example. Hereinafter, the routing device 20 may also be referred to as a switch 20.

The switch 20 illustrated in FIG. 3 is a five-port switch 20 used for a two dimensional meshed network, and is provided with a communication controller 220, network ports 101-1 through 101-4, and a node port 110.

The network ports 101-1 through 101-4 are communication ports used for communication with another switch 20, and are connected communicatively to other switches 20 via communication lines.

These network ports 101-1 through 101-4 are provided with a configuration similar to each other. Hereinafter, as the reference numerals representing the network ports, the reference numerals 101-1 through 101-4 are used when it is desired to specify one among the plurality of network ports, while a reference numeral 101 is used when referring to an arbitrary network port. To the node port 110, the calculation nodes 200 are connected.

In FIG. 3, for the convenience, a detailed configuration, such as each network port 101, the node port 110, and the communication controller 220, is omitted from the illustration.

The network port 101 is provided with, as illustrated in FIG. 3, a port sender 102 and a port receiver 106.

The port receiver 106 carries out receiving of a packet sent from another switch 20 connected via the communication line. In other words, this port receiver 106 functions as an inputting unit to which a packet is inputted.

This port receiver 106 is provided with a buffer 107 and a receiving controller 108. The buffer 107 is an FIFO (first in, first out) type memory that stores packets sent from other switches 20 connected thereto.

The receiving controller 108 carries out control of receiving a packet from another switch 20 and storing it in the buffer 107. The receiving controller 108 also carries out control of sending out the packet stored in the buffer 107 to the network port 101 corresponding to a destination of the packet or the node port 110 via the communication controller 220.

This receiving controller 108 replies a sending permission to a sending request sent from another switch 20 when the buffer 107 becomes in a state allowing to store a packet. Then, the receiving controller 108 receives a packet sent from another switch 20 and stores it in the buffer 107.

The receiving controller 108 determines the network port 101 and the calculation node 200 of the transfer destination referring to a routing header and a remote address of the received packet. Then, the receiving controller 108 sends out a sending request via the communication controller 220 to a sending controller 104 of the port sender 102 of the network port 101 or a sending controller 113 of a port sender 111 of the node port 110 thus determined. Upon receiving the sending permission from the sending controllers 104, the receiving controller 108 sends out the packet stored in the buffer 107 via the communication controller 220 to the port sender 102 of the network port 101 or the port sender 111 of the node port 110.

The port sender 102 carries out sending of a packet to another switch 20 connected via the network 2. In other words, this port sender 102 functions as an outputting unit to output a packet.

This port sender 102 is provided with a buffer 103 and the sending controller 104. The buffer 103 is an FIFO type memory that stores packets to be sent out to other switches 20 connected thereto.

The sending controller 104 carries out control of sending out a packet stored in the buffer 103 to another switch 20.

This sending controller 104 receives a packet and a sending request to be sent from the port receiver 106 of another network port 101 to another switch 20, and sends a packet to another switch 20 in accordance with this sending request. The sending controller 104 sends out a sending request to the switch 20 when sending a packet to another switch 20, and sends out the packets stored in the buffer 103 upon receiving a sending permission from this switch 20. The sending controller 104 also receives a sending request from the port receiver 106 of another network port 101 via the communication controller 220, and upon becoming in a state allowing to store a packet in the buffer 103, sends a sending permission to the receiving controller 108 of the port receiver 106.

The node port 110 is connected communicatively to the calculation nodes 200 and carries out delivery and reception of packets with the calculation nodes 200 connected thereto.

The node port 110 is provided with, as illustrated in FIG. 3, the port sender 111 and a port receiver 114. The port sender 111 sends the packet received by the network port 101 at the switch 20 to the interconnection network interface of the calculation node 200 connected thereto.

The port sender 111 sends packets to the interconnection network interfaces of the calculation nodes 200 connected thereto. In other words, this port sender 111 functions as an outputting unit to output packets.

This port sender 111 is provided with a buffer 112 and the sending controller 113. The buffer 112 is an FIFO type memory to store packets to be sent out to the interconnection network interfaces of the calculation nodes 200 connected thereto. The sending controller 113 carries out control of sending out packets stored in the buffer 112 to the calculation node 200.

This sending controller 113 receives a sending request and a packet from the network port 101 via the communication controller 220 and sends the packet to the calculation node 200 in accordance with this sending request. The sending controller 113 sends out a sending request to the interconnection network interface when sending a packet to the calculation node 200. Then, upon a sending permission being responded by the interconnection network interface, the sending controller 113 sends out a packet stored in the buffer 112 to the interconnection network interface. The sending controller 113 also sends a sending permission to the network port 101 via the communication controller 220 when it becomes in a state allowing to store a new packet in the buffer 112.

The port receiver 114 receives packets sent from the interconnection network interfaces of the calculation nodes 200. In other words, this port receiver 114 also functions as an inputting unit to have a packet inputted thereto.

The port receiver 114 is provided with a buffer 115 and a receiving controller 116. The buffer 115 is an FIFO type memory to store packets received from the interconnection network interfaces of the calculation nodes 200 connected thereto. The receiving controller 116 receives packets sent from the interconnection network interfaces and carries out control of storing in the buffer 115. The receiving controller 116 also carries out control of sending out a packet stored in the buffer 115 to the network port 101 corresponding to a destination of the packet via the communication controller 220.

This receiving controller 116 replies a sending permission to a sending request sent from the interconnection network interface of the calculation node 200 when the buffer 115 becomes in a state allowing to store a packet. Then, the receiving controller 116 receives a packet sent from the interconnection network interface and stores it in the buffer 115.

The receiving controller 116 determines the network port 101 of a transfer destination referring to a routing header and a remote address of the received packet, and sends out a sending request to the sending controller 104 of the port sender 102 of the network port 101 via the communication controller 220. The receiving controller 116 sends out a packet stored in the buffer 115, upon receiving a sending permission from the network port 101, to the port sender 102 of the network port 101 via the communication controller 220.

The communication controller 220 controls sending and receiving of data between the network ports 101. An output port arbitration unit 21 and a data crossbar switch 22, described later, achieve this communication controller 220.

The switch 20 is provided with, as illustrated in FIG. 1, the output port arbitration unit 21, the data crossbar switch 22, an adding processing unit 25, a plurality of input ports 23-1 through 23-5, and a plurality of output ports 24-1 through 24-5.

As the reference numerals representing the input ports, hereinafter, the reference numerals 23-1 through 23-5 are used when it is desired to specify one among the plurality of input ports, while a reference numeral 23 is used when referring to an arbitrary input port. Similarly, hereinafter, as the reference numerals representing the output ports, the reference numerals 24-1 through 24-5 are used when it is desired to specify one among the plurality of output ports, while a reference numeral 24 is used when referring to an arbitrary output port.

Then, the network ports 101 and the node ports 110 described above function as these input ports 23 and the output ports 24. In addition, one input port 23 and one output port 24 form one port. For example, the network port 101-1 is equivalent to the input port 23-1 and the output port 24-1, and the network port 101-2 is equivalent to the input port 23-2 and the output port 24-2, respectively. Similarly, the network port 101-3 is equivalent to the input port 23-3 and the output port 24-3, and the network port 101-4 is equivalent to the input port 23-4 and the output port 24-4, respectively. Further, the node port 110 is equivalent to the input port 23-5 and the output port 24-5.

The output port 24 is connected communicatively to the calculation node 200 and other switches 20 via the communication lines to output a packet to these external units. The output port 24 has a packet inputted to any of the input ports 23-1 through 23-5 as an output packet outputted thereto to output this packet thus set.

Each output port 24 is released after completion of sending out of a packet to other switches 20 on a downstream and the calculation node 200. Here, to be released is a state that the output port 24 can accept data. The sending controllers 104 and 113 described above carry out sending of a sending permission as, for example, the output port 24 is released.

The input port 23 is connected communicatively to the calculation node 200 and other switches 20 via the communication lines, and has the packets outputted from these external units inputted thereto. The input port 23 is provided with a buffer 231 capable of storing a plurality of packets inputted thereto. This buffer 231 stores the inputted packets FIFO and sends out the packets stored in this buffer 231 in order of oldness to the output port 24. The buffers 107 and 115 illustrated in FIG. 3 are equivalent to this buffer 231. Hereinafter, among the packets stored in the buffer 231 at the input port 23, the oldest packet, in other words, a packet to be firstly outputted from the input port 23 may be referred to as an initial packet.

In addition, hereinafter, regarding the reference numerals 23-1 through 23-5 representing the input ports, the numbers 1 through 5 following—(hyphen) may be referred to as port numbers.

In the present parallel computer system 1, a packet size S, destination information D, and a priority counter value (priority information) P are stored in, for example, initial words of a header of a packet. The packet size S, the destination information D, and the priority counter value P are readable in an FIFO storage state. The priority counter value P is writable.

The packet size S is information representing a size of the packet, and the destination information D is information representing a destination of the packet. The packet size S and the destination information D are also provided in packets delivered and received in existing parallel computer system 1, and thus details are omitted from the description.

The priority counter value P is a value representing an accumulated time period during which the packet is delayed for transfer process, and the output port arbitration unit 21 described later carries out selection of a packet for priority processing based on this priority counter value P.

Specifically, as described later, in a case that a packet is not selected by arbitration because another packet is selected as a result of arbitration by the output port arbitration unit 21 when occurring a conflict, a packet size Sn of the selected packet (output packet) is added to the priority counter value P of the unselected packet.

In other words, the priority counter value P is subjected to addition of the packet size Sn of the selected output packet by arbitration in a case that the packet becomes unselected by the arbitration carried out at the time of conflict.

Figure 4:
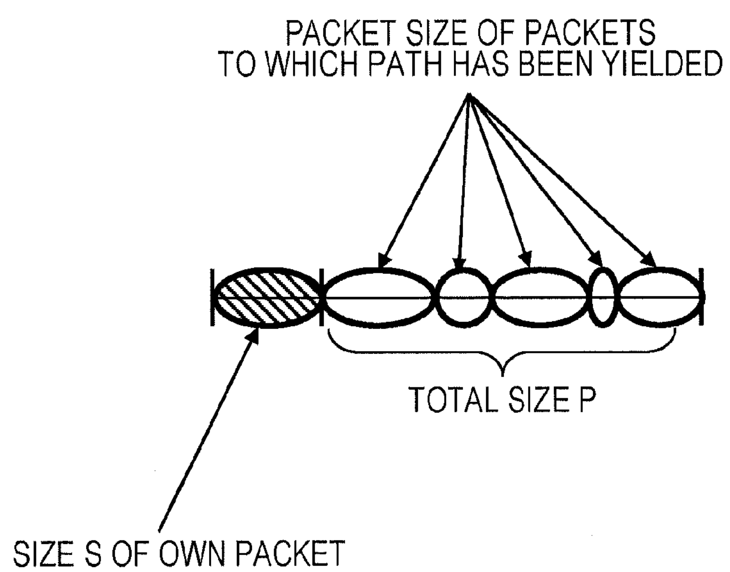
FIG. 4 is a drawing illustrating a priority counter value at a switch as an example of an embodiment.

FIG. 4 is a drawing illustrating a priority counter value P at a switch 20 as an example of an embodiment.

As illustrated in FIG. 4 here, the priority counter value P is a total value (total size) of the packet size of each packet to which the path has been yielded by the packet due to the arbitration of the output port arbitration unit 21.

In addition, the packet size S, the destination information D, and the priority counter value P of the initial packet at the input port 23 are stored respectively in registers REG_S, REG_D, and REG_P of the output port arbitration unit 21 described later.

In FIG. 1, the packet size S, the destination information D, and the priority counter value P of the initial packet at each input port 23 are represented with respective port numbers.

The output port arbitration unit 21 carries out control to deliver a packet inputted to the input port 23 to the output port 24 corresponding to the output destination. Regarding the packet inputted to each input port 23, the output port arbitration unit 21 reads out a destination from the header and selects the output port 24 corresponding to the destination. The selection of the output port 24 is carried out by, for example, referring to a preset routing table (not illustrated). Then, the output port arbitration unit 21 delivers a packet to the output port 24, which is the output destination, via the data crossbar switch 22. Hereinafter, the delivery of a packet to the output port 24 may be referred to as an output of a packet to the output port 24.

The output port arbitration unit 21 confirms each destination of the packets stored in the input port 23 upon completion of process of sending out packets to other switches 20 on a downstream and to the calculation node 200 at the output port 24, and selects one packet having the output port 24 as the destination as the output packet. This selected output packet is delivered to the output port 24, which is the output destination, by the data crossbar switch 22.

Here, a state of storing packets having an identical output port 24 as the destination in a plurality of input ports 23 at the same time in the switch 20 is referred to as a conflict state, and these plurality of packets having an identical output port 24 as the destination are referred to as conflict packets.

In such conflict state, the output port arbitration unit (selector) 21 selects one packet having the largest priority counter value P among these conflict packets as the output packet. In other words, the output port arbitration unit 21 selects the output packet among the conflict packets based on the priority counter value P set in each conflict packet.

Figure 5:
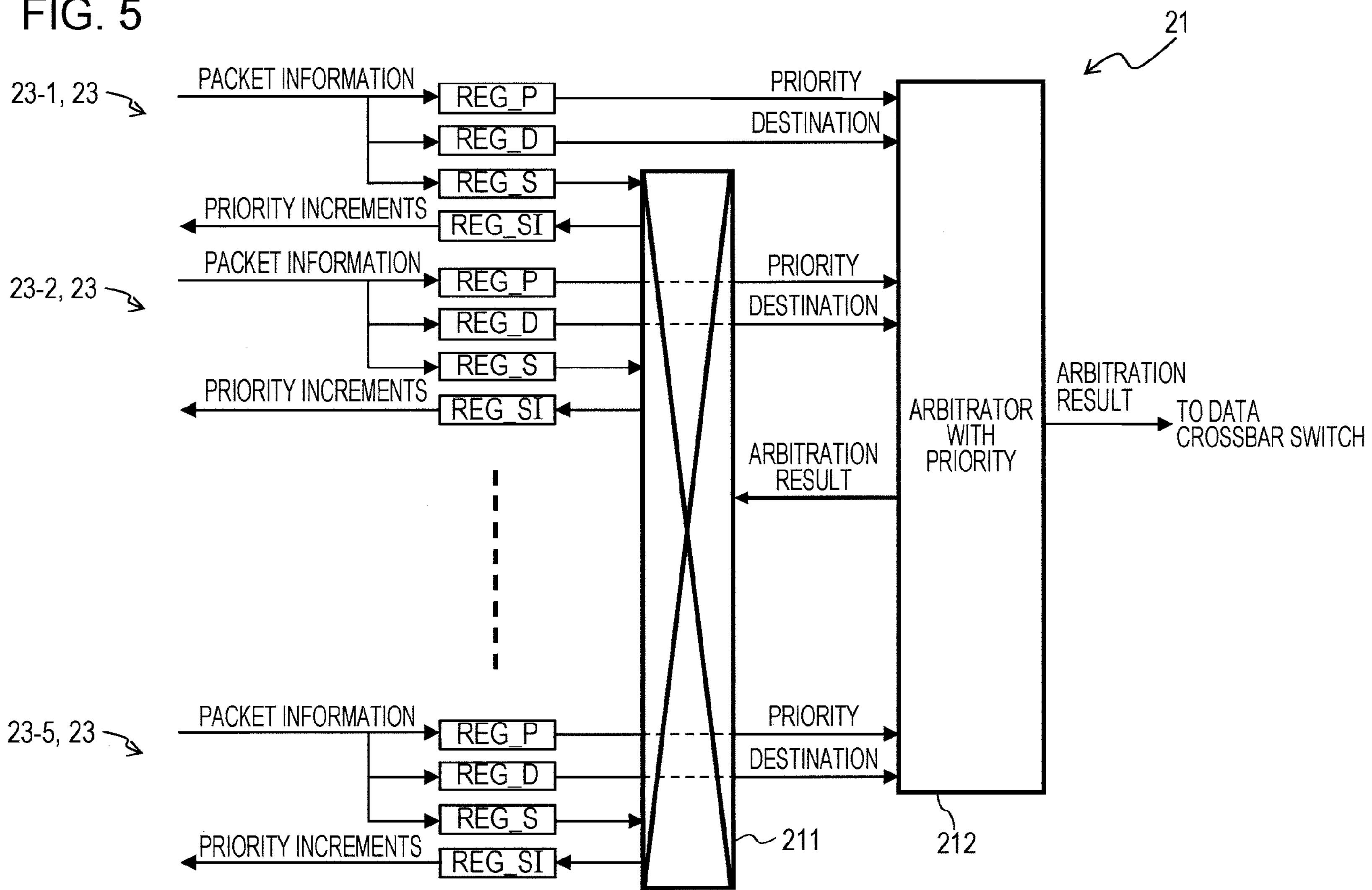
FIG. 5 is a drawing schematically illustrating a hardware configuration of an output port arbitration unit at a switch as an example of an embodiment.

FIG. 5 is a drawing schematically illustrating a hardware configuration of an output port arbitration unit 21 at a switch 20 as an example of an embodiment.

As illustrated in FIG. 5 here, the output port arbitration unit 21 is provided with registers REG_P, REG_D, REG_S, REG_SI, a crossbar switch 211 for size value exchange, and an arbitrator 212 with priority.

The registers REG_P, REG_D, REG_S, and REG_SI are provided for each input ports 23-1 through 23-5, respectively.

In the register REG_P, the priority counter value P read out from the header of the initial packet at the input port 23 is stored. In other words, in the register REG_P provided for the input port 23-1, the priority counter value P of the initial packet at the input port 23-1 is stored. Similarly, in the respective registers REG_P provided respectively for the input ports 23-2 through 23-5, the priority counter values P of the respective initial packets at the input ports 23-2 through 23-5 are stored, respectively.

In the register REG_D, the destination information D read out from the header of the initial packet at the input port 23 is stored. In other words, in the register REG_D provided for the input port 23-1, the destination information D of the initial packet at the input port 23-1 is stored. Similarly, in the respective registers REG_D provided respectively for the input ports 23-2 through 23-5, the destination information D of the respective initial packets at the input ports 23-2 through 23-5 is stored, respectively.

In the register REG_S, the packet size S read out from the header of the initial packet at the input port 23 is stored. In other words, in the register REG_S provided for the input port 23-1, the packet size S of the initial packet at the input port 23-1 is stored. Similarly, in the respective registers REG_S provided respectively for the input ports 23-2 through 23-5, the packet sizes S of the respective initial packets at the input ports 23-2 through 23-5 are stored, respectively.

In the register REG_SI, the packet size S outputted from the crossbar switch 211 for size value exchange described later is stored. In other words, in the register REG_SI provided for the input port 23-1, the packet size S outputted from the crossbar switch 211 for size value exchange and added to the priority counter value P at the input port 23-1 is stored. Similarly, in the respective registers REG_SI provided respectively for the input ports 23-2 through 23-5, the packet sizes S outputted from the crossbar switch 211 for size value exchange and added to the priority counter values P of the respective initial packets at the input ports 23-2 through 23-5 are stored, respectively.

The packet sizes S stored in these registers REG_SI is inputted to the adding processing unit 25 described later as an addition value Sn.

The registers REG_P, REG_D, REG_S, and REG_SI may also be provided in each port 101, and can be performed in a variety of modification.

The arbitrator 212 with priority carries out control to deliver a packet inputted to each input port 23 to the output port 24 of the output destination. Specifically, the arbitrator 212 with priority notifies the data crossbar switch 22 on the downstream of information indicating a packet stored in which input port 23 to be outputted to each output port 24 as an arbitration result. The arbitrator 212 with priority also notifies the crossbar switch 211 for size value exchange of this arbitration result.

The arbitration result is represented with, for example, {In1, In2, In3, In4, In5}. Here, In1 through In5 correspond respectively to the output ports 24-1 through 24-5. For example, In3 corresponds to the output port 24-3.

Then, the arbitration result is configured by matching these In1 through In5 with information specifying the input port 23 having the packet to be outputted stored therein.

For example, with In1 through In5, any of the port numbers 1, 2, 3, 4, and 5 of the input port 23 is matched.

Specifically, an arbitration result {In1, In2, In3, In4, In5}={0, 0, 2, 0, 0}, for example, represents to output a packet stored in the input port 23-2 to the output port 24-3. It is noted that the port number 0 represents not to let the output port 24 carry out an output.

To this arbitrator 212 with priority, the destination information D and the priority counter value P of the initial packet at each input port 23 are inputted from each register REG_D and each register REG_P.

The arbitrator 212 with priority monitors a release status of the output port 24, and as detecting the output port 24 in a packet acceptable state, confirms whether or not a packet having the output port 24 as the output destination is stored in each input port 23.

Specifically, based on the destination information D obtained from the register REG_D corresponding to each input port 23, the arbitrator 212 with priority specifies the output port 24 to be an output of each packet by, for example, referring to the routing table (not illustrated).

In a state that packets having the output port 24 turned in a released state as the output destination is stored in a plurality of input ports 23, in other words, in a state of occurring conflict, the arbitrator 212 with priority arbitrates the conflict and selects one packet (selected packet) to be delivered firstly to the output port 24 of the output destination.

Specifically, the arbitrator 212 with priority obtains the priority counter value P of each register REG_P of the conflicting packets and selects a packet having a largest priority counter value P as the output packet. The arbitrator 212 with priority notifies the data crossbar switch 22 of the arbitration result to output the initial packet at the input port 23 having the selected packet stored therein to the output port 24.

The arbitrator 212 with priority also notifies the crossbar switch 211 for size value exchange of the arbitration result. It is noted that the arbitration result notified to the crossbar switch 211 for size value exchange also includes information (for example, port number) of the input ports 23 storing unselected packets not selected as the output packet among the conflict packets.

In a state that a packet having the output port 24 turned in a released state as the output destination is stored only in one input port 23, in other words, in a state of not occurring conflict, the arbitrator 212 with priority also notifies the data crossbar switch 22 and the crossbar switch 211 for size value exchange of the arbitration result to output the initial packet at the input port 23 to the output port 24.

The crossbar switch 211 for size value exchange reads out the packet size S from the register REG_S corresponding to the input port 23 having the packet selected as the output packet stored therein, and stores this packet size S in the registers REG_SI corresponding to the input ports 23 having the unselected packets stored therein.

As receiving the arbitration result from the arbitrator 212 with priority, the crossbar switch 211 for size value exchange reads out the packet size S of the packet determined as the output packet by the arbitration from the register REG_S. Then, the crossbar switch 211 for size value exchange stores the packet size S thus read out in respective registers REG_SI corresponding to the input ports 23 having the unselected packets among the conflict packets stored therein.

The adding processing unit (processing unit) 25 updates the respective priority counter values P of the unselected packets that are not selected as the output packet among the plurality of conflict packets by the output port arbitration unit 21 based on weighting information in accordance with the packet size S. Specifically, the adding processing unit 25 adds the packet size S (addition value Sn) of the output packet selected by the output port arbitration unit 21 to the respective priority counter values P of the packets not selected as the output packet among the conflict packets (unselected packets).

For example, as the packet size S is stored in the register REG_SI by the crossbar switch 211 for size value exchange, the adding processing unit 25 reads out the priority counter value P of the packet from the header of the initial packet (unselected packet) of the corresponding input port 23. Then, the adding processing unit 25 adds the packet size S (addition value Sn) of the register REG_SI to the priority counter value P thus read out, and stores the value after the addition as a new priority counter value P in the header of the packet. In other words, as arbitration for conflict is carried out by the output port arbitration unit 21, the adding processing unit 25 updates the priority counter value P of the unselected packets among the conflict packets by adding the packet size S of the output packet.

The addition and updating process of the priority counter value P by the adding processing unit 25 is performed only on the packets that are initial packets in the buffers 231 at the input ports 23 and are also not selected by the arbitration. In other words, the update of the priority counter value P is not carried out on the other packets (following packets) following the initial buffers in the buffer 231.

This adding processing unit 25 is provided, for example, in each port 101. It is noted that this adding processing unit 25 may also be provided in the communication controller 220 and can be performed in a variety of modifications.

The data crossbar switch 22 reads out the initial packet at the input port 23 based on the arbitration result notified from the arbitrator 212 with priority of the output port arbitration unit 21, and delivers it to the output port arbitration unit 21, which is the output destination of this packet.

As just explained, in the present switch 20, every time arbitration for packet output is carried out in the output port arbitration unit 21, an instruction to increment the priority counter value P of the packets to be kept waiting (unselected packets) as a result of the arbitration is carried out. At the same time, the output port arbitration unit 21 carries out a data transfer instruction to the data crossbar switch 22 based on the arbitration result, and the data crossbar switch 22 carries out packet transfer in accordance with this.

Figure 6:
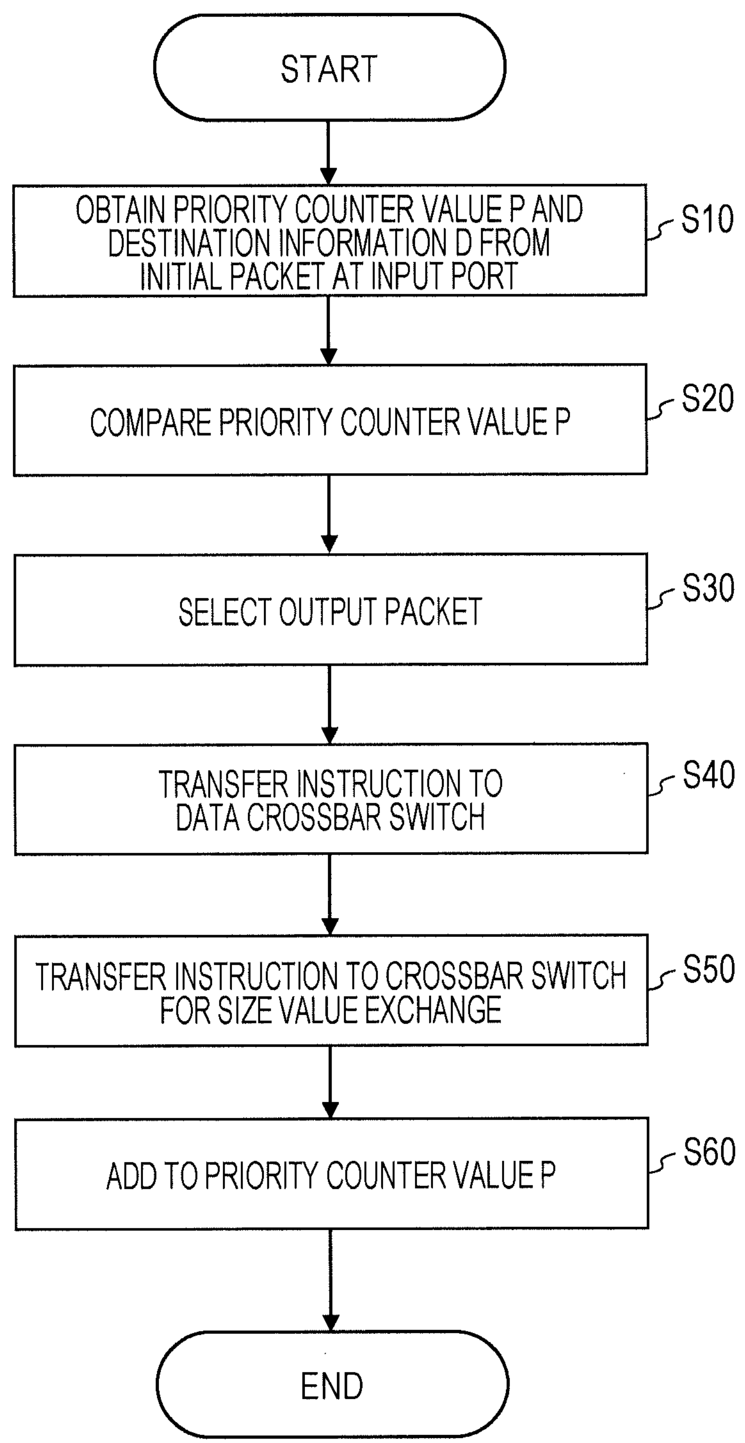
FIG. 6 is a flowchart to explain processing when occurring a conflict at a switch as an example of an embodiment.
Figure 7:
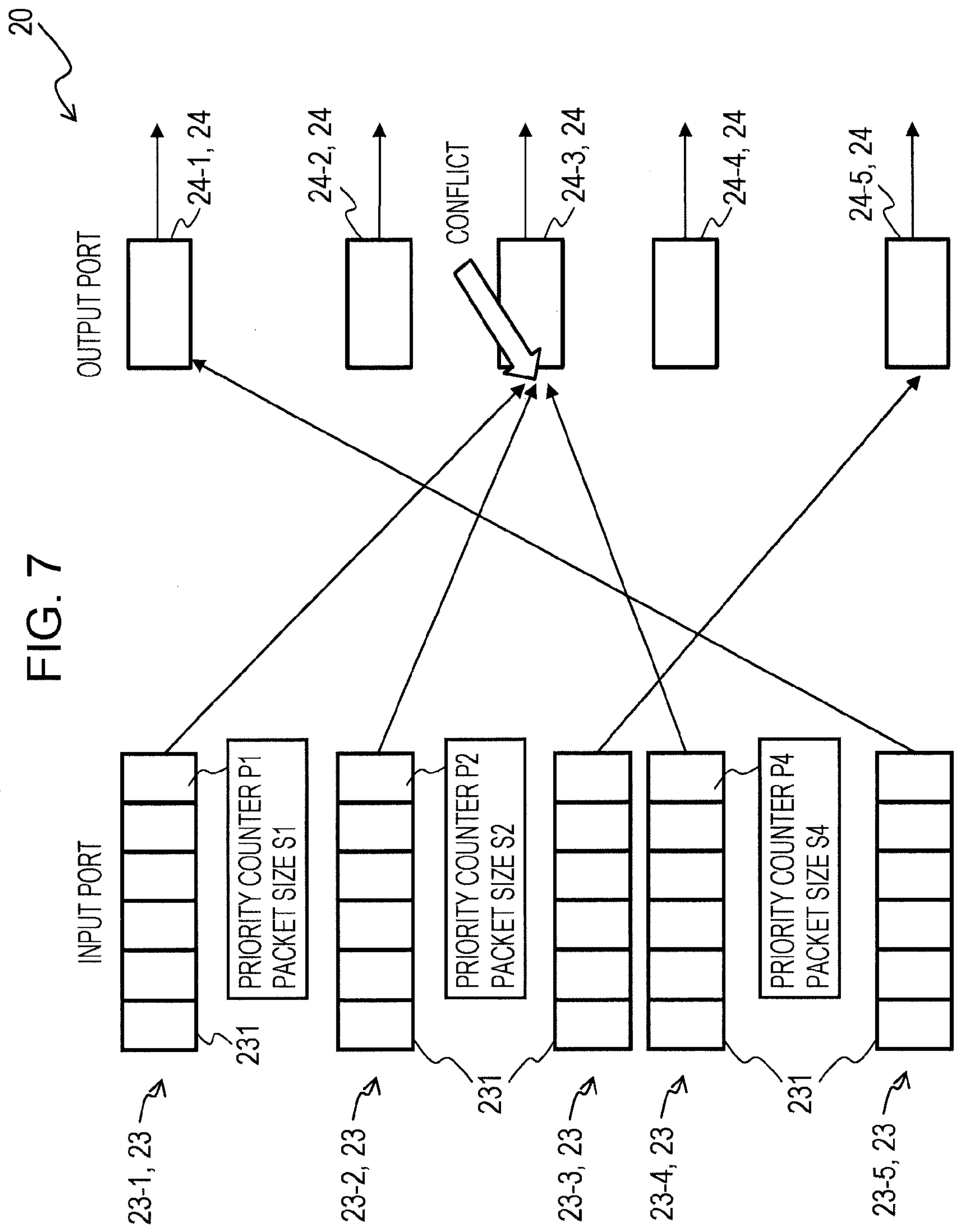
FIG. 7 is a drawing schematically exemplifying a state of an input port and an output port at a switch as an example of an embodiment.
Figure 8:
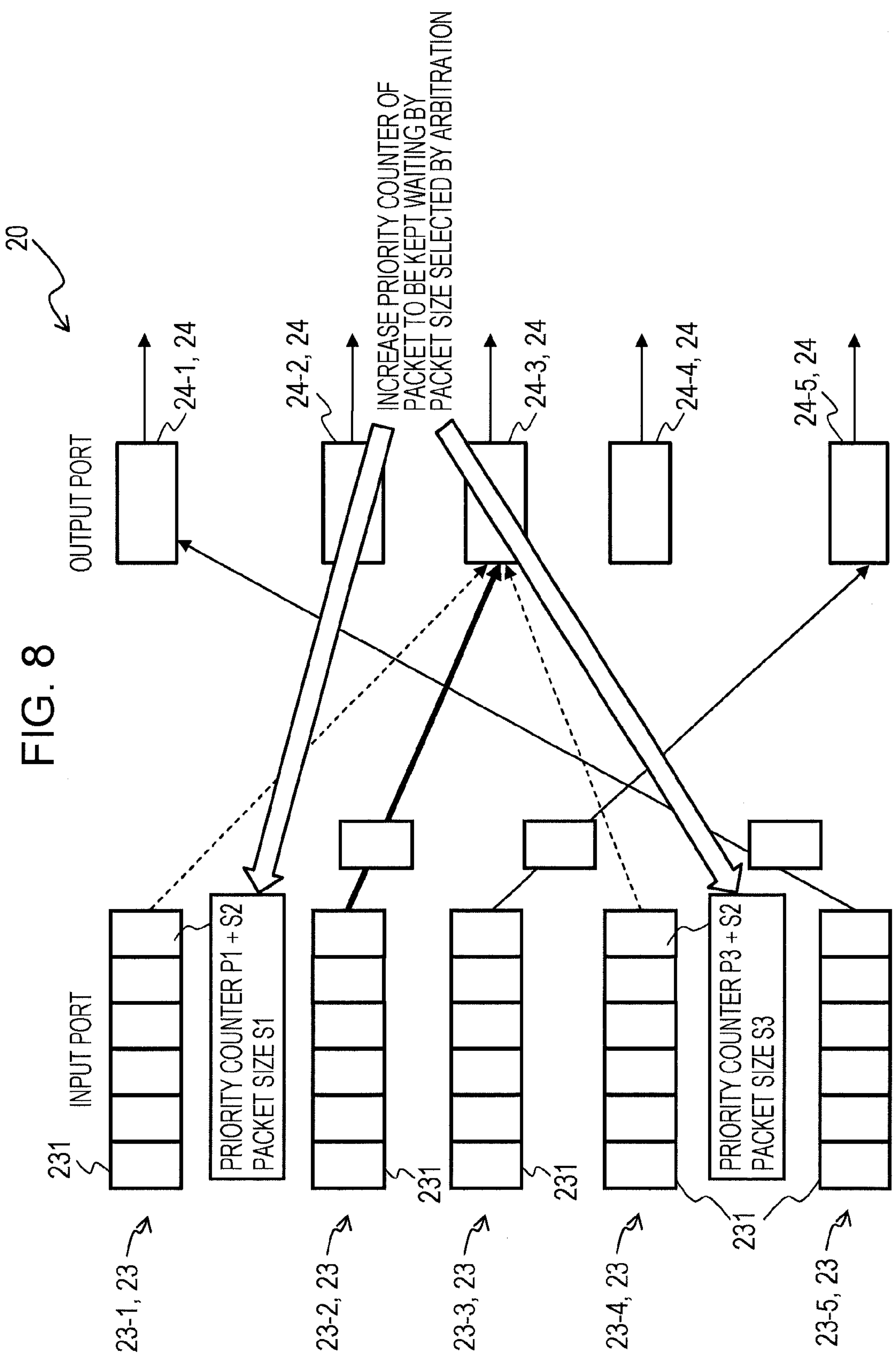
FIG. 8 is a drawing schematically exemplifying a state of an input port and an output port at a switch as an example of an embodiment.

A description is given to processing when occurring a conflict at the switch 20 as an example of the embodiment configured as above with reference to FIG. 7 and FIG. 8 in accordance with the flowchart (operations S10 through S60) illustrated in FIG. 6. FIG. 7 and FIG. 8 are drawings schematically exemplifying a state of an input port 23 and an output port 24 at a switch 20.

In the switch 20, when the output port 24-3, for example, is released, the arbitrator 212 with priority of the output port arbitration unit 21 obtains the destination information D and the priority counter value P from the registers REG_D and REG_P corresponding to each input port 23 (operation S10).

Here, as illustrated in FIG. 7, the respective initial packets of the input ports 23-1, 23-2, and 23-4 has this output port 24-3 as the output destination, which is in a conflict state. The arbitrator 212 with priority carries out arbitration of these conflict packets. In other words, the arbitrator 212 with priority obtains the respective priority counter value P from each register REG_P corresponding to these input ports 23-1, 23-2, and 23-4. Then, comparing the priority counter values P of these conflict packets (operation S20), a packet having a largest priority counter value P is selected as the output packet (operation S30).

In this example, it is assumed that the priority counter value P2 of the packet at the input port 23-2 is a value larger than the priority counter values P1 and P4 of the packets at the input ports 23-1 and 23-4. In other words, the arbitrator 212 with priority selects the initial packet at the input port 23-2 as the output packet of the output port 24-3.

The arbitrator 212 with priority carries out a transfer instruction to the data crossbar switch 22 to output the initial packet at the input port 23-2 selected as the output packet (operation S40).

In the example illustrated in FIG. 8, as a result of arbitration by the output port arbitration unit 21, the initial packet at the input port 23-2 is set to the output port 24-3 and also the initial packets of the respective input ports 23-3 and 23-5 are outputted respectively to the output ports 24-5 and 24-1. Accordingly, the arbitrator 212 with priority notifies the data crossbar switch 22 of {In1, In2, In3, In4, In5}={5, 0, 2, 0, 3} as the arbitration result.

The arbitrator 212 with priority also notifies the crossbar switch 211 for size value exchange of the arbitration result. In other words, to the registers REG_SI corresponding to the input ports 23-1 and 23-4 having the unselected packets stored therein, a transfer instruction is carried out respectively to store the packet size S2 of the initial packet of the input port 23-2, which is the output packet (operation S50).

The processing sequence of these operations S40 and S50 may be opposite, and the processing may also be carried out at the same time, and thus it can be performed by being modified appropriately.

The adding processing unit 25 reads out the packet size S2 from the registers REG_SI corresponding to the input ports 23-1 and 23-4 as the addition value Sn (Sn1 and Sn4). Then, the adding processing unit 25 adds the addition value Sn (Sn1 and Sn4) to each priority counter value P for the initial packets (unselected packets) of these input ports 23-1 and 23-4 (operation S60) to terminate the process.

As just explained, according to the parallel computer system 1 as an example of the embodiment, in a case that a packet becomes unselected due to the arbitration carried out at the time of conflict, the priority counter value P of the packet at the input port 23 is added with the packet size Sn of the output packet selected by the arbitration. In other words, a packet going through a longer period as an unselected packet by loosing the arbitration has a greater value of the priority counter value P.

Then, when a conflict is generated, the output port arbitration unit 21 selects a packet having a largest priority counter value P among the conflict packets to output it as the output packet.

This enables the packet going through the longest period as an unselected packet by loosing the arbitration when a conflict is generated to be selected as the output packet in priority and to carry out inter-node communication that uniformizes the data arrival time to a destination node. It also secures the fairness of the bandwidth for each node.

Figure 9:
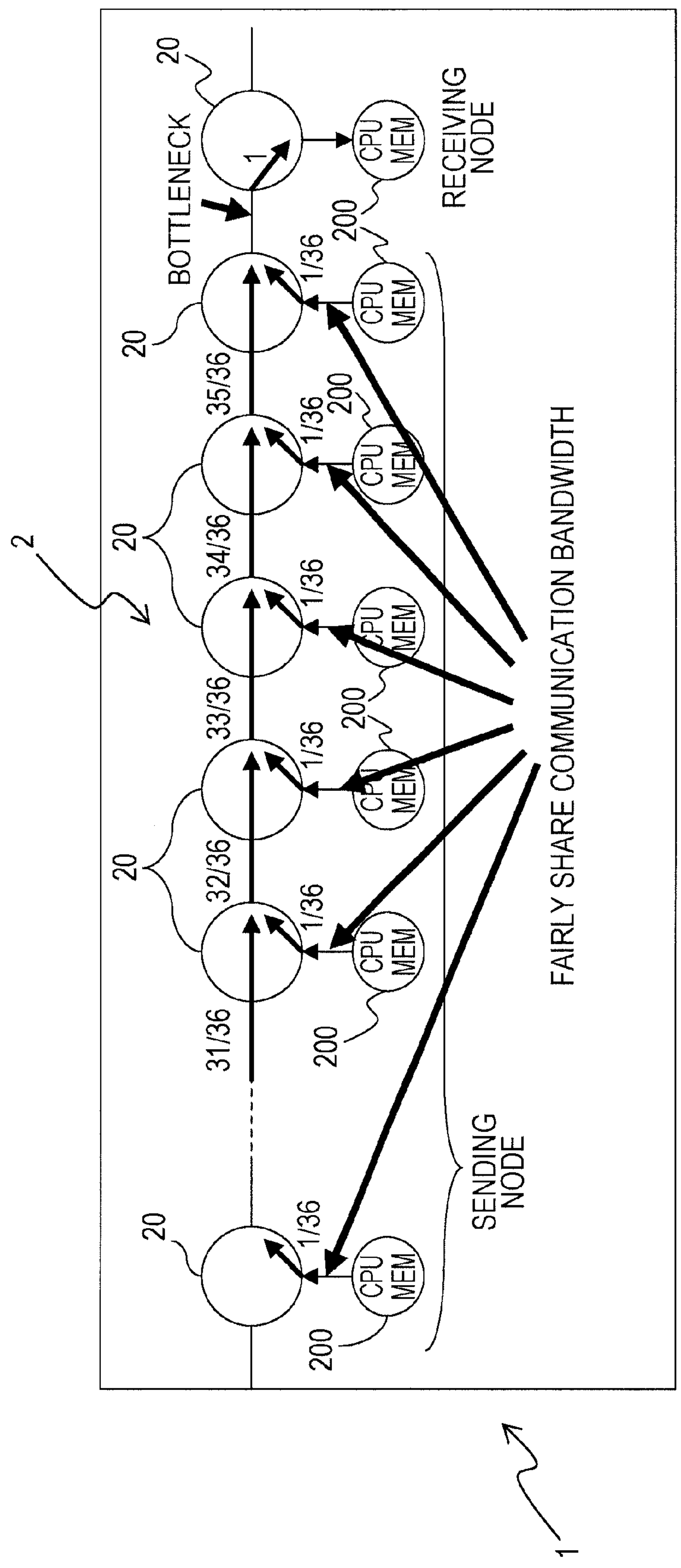
FIG. 9 is a drawing illustrating a state of packet transfer in a parallel computer system provided with switches as an example of an embodiment.
Figure 10:
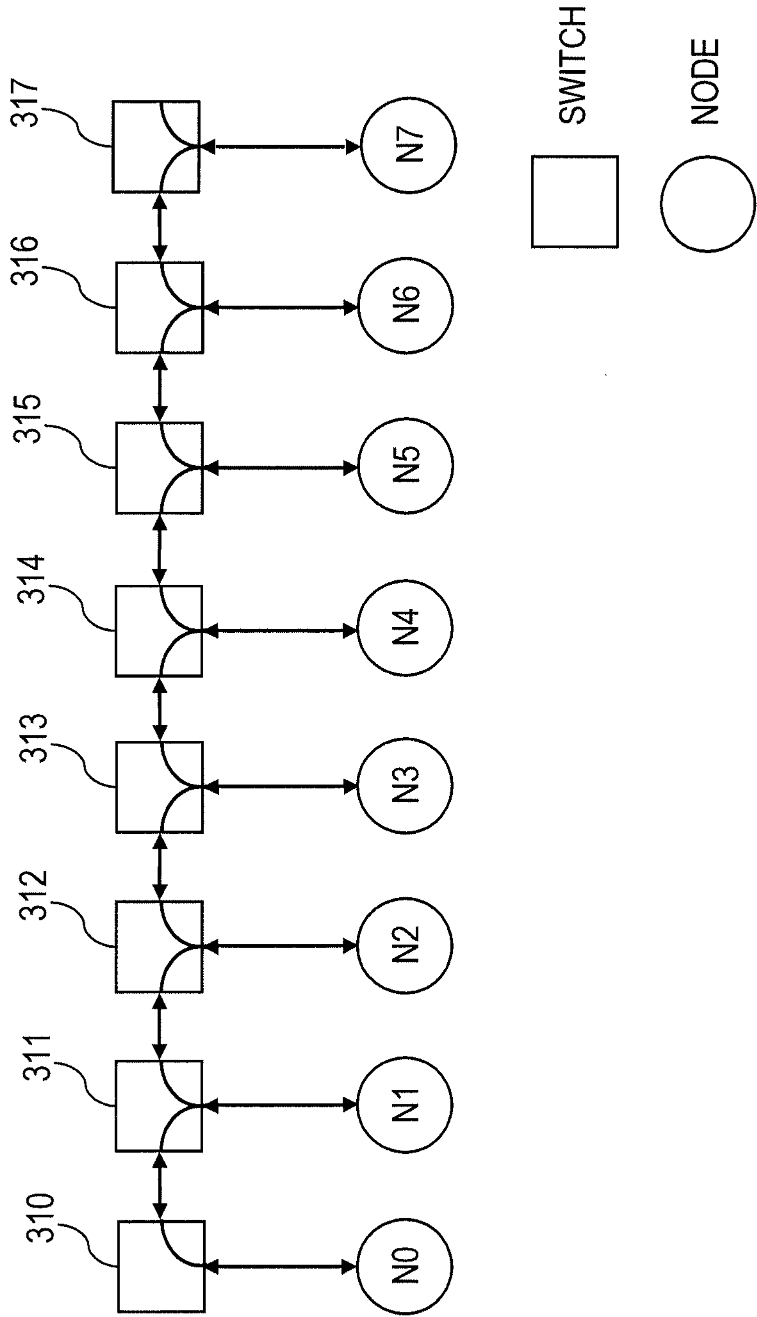
FIG. 10 is a drawing illustrating a configuration example of a parallel computer.
Figure 11:
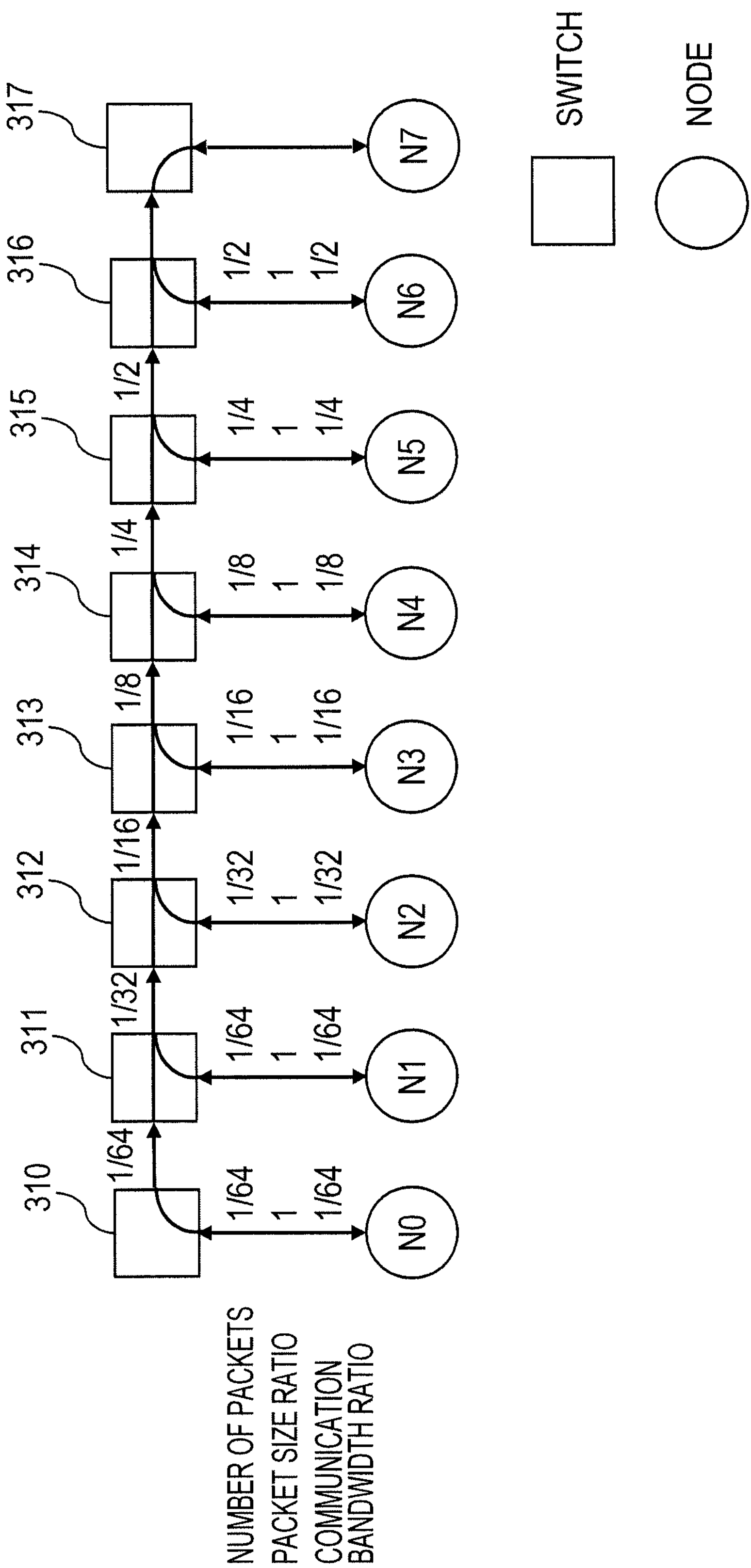
FIG. 11 is a drawing illustrating an example of group communication in which nodes N0 through N6 send data to a node N7.

FIG. 9 is a drawing illustrating a state of packet transfer in a parallel computer system 1 provided with switches 20 as an example of an embodiment.

As illustrated in FIG. 9 here, in the parallel computer system 1 provided with the present switches 20, priority of a packet increases as often as the packet is blocked by the output arbitration in a process of moving in the network 2. Then, in an area of occurring congestion as a bottleneck in the network 2, the arbitration balances in a direction of fairly securing a communication bandwidth for each calculation node 200, which is the packet originator. In other words, it becomes possible to fairly share the communication bandwidth for packet transmission between the respective calculation nodes 200.

It becomes also possible to immediately attempt bandwidth balancing for each node globally only by adding one field to store the priority counter value P in a packet and carrying out adding process of the priority counter value P locally for each switch 20 and arbitration by magnitude comparison. It also has an advantage of being highly easy to be achieved by hardware.

As illustrated in FIG. 4, in the present switch 20, one certain packet is focused, and the own packet size is defined as S and the total size of the packets to which the path has been yielded by loosing the arbitration is as P. This value of P is accounted for the priority counter value P of the own packet.

Here, a path occupancy (allocated bandwidth ratio) of the own packet is S/(S+P), and the bandwidth allocated to this packet can be considered as S/(S+P) of a link bandwidth. After going through some path arbitration to reach P>>S, it is possible to proximate to $S/(S+P) \approx 1/P$.

When arbitrating the output packet in each switch 20, selecting a packet having a smallest allocated bandwidth ratio (=1/P) at that time, in other words, a packet having a maximum priority counter value P is considered to bring equalization of the bandwidth ratio 1/P in each packet. Consequently, by attempting equalization of the bandwidth ratio in each and every packet, equalization of the bandwidth of each originator node is achieved.

Then, the disclosed technique is not limited to the above embodiment, and can be performed in a variety of modifications not departing from the scope of the spirit of the present embodiment.

For example, in the above embodiment, in a case that a packet becomes unselected by the arbitration carried out at the time of conflict, the packet size Sn of the output packet selected by the arbitration is added to the priority counter value P, while the process is not limited to this.

For example, instead of the packet size Sn of the output packet selected by the arbitration, a value obtained based on this packet size Sn may also be used, and for example, a value obtained in proportion to the packet size Sn may also be used as the addition value. In addition, a time period that the unselected packet has been kept waiting for the arbitration, in other words, the time period that the output packet selected by the arbitration takes to be outputted to the output port 24 is measured and a value based on this time period may also be added to the priority counter value P as the addition value.

Still in addition, in the above embodiment, the selection of the output port 24 is carried out by the output port arbitration unit 21 by referring to a routing table based on the destination information D, the process is not limited to this. In other words, information specifying an output port is stored for each hop of a packet as the destination information D of each packet, and the selection of the output port 24 may also be carried out by the output port arbitration unit 21 in accordance with the information and can be performed by modifying appropriately.

Further, in the present embodiment, an example of switches as the routing devices (communication control devices) 20 is represented, while they are not limited to them, and for example, they may also be carried out by applying to other communication equipments, such as routers.

In addition, in the above embodiment, an example of configuring the network 2 as a one dimensional meshed network is described for the convenience, while it is not limited to this and it can be naturally applicable to a network provided with a more complex configuration.

In the above embodiment, the switch 20 is configured as a five-port switch provided with five ports, while it is not limited to this and the switch 20 may also be provided with four or less or six or more ports.

Then, those skilled in the art can carry out and manufacture the present embodiment with the above disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication control device, comprising: a plurality of inputting units to which a packet having a first priority counter value set as priority information is inputted; a plurality of outputting units to which the packet is outputted; a selector that selects an output packet to output, from among a plurality of conflict packets having an identical outputting unit as a destination, based on the first priority counter value set in each conflict packet, the plurality of conflict packets being among a plurality of packets inputted to the plurality of inputting units; and a processing unit that sets, as the priority information, a second priority counter value in each of unselected packets that have failed to be selected as the output packet from among the plurality of conflict packets, wherein the second priority counter value is calculated by updating the first priority counter value set in each of the unselected packets, based on weighting information in accordance with a packet size of the selected output packet, so that next selection of the output packet from among the plurality of conflict packets is performed based on the calculated second priority counter values set in the plurality of conflict packets, wherein the selector includes a conflict packet specifier that specifies the conflict packets based on destination information obtained from the plurality of packets respectively, and an output packet selector that selects the output packet, from among the conflict packets specified by the conflict packet specifier, based on the first priority counter values set in the conflicts packets, and wherein the second priority counter value is calculated by adding a value obtained in proportion of the packet size of the selected output packet, to each of the first priority count values set in the unselected packets.

2. The communication control device according to claim 1, wherein the second priority counter value is calculated by adding the packet size of the selected output packet to each of the first priority count values set in the unselected packets.

3. The communication control device according to claim 1, wherein the second priority counter value is calculated by adding a value obtained in proportion of a time period that has been taken for the unselected packets to be kept waiting for selection of the output packet, to each of the first priority count values set in the unselected packets.

4. A parallel computer system, comprising: a communication control device, including: a plurality of inputting units to which a packet having a first priority counter value set therein is inputted, a plurality of outputting units to which the packet is outputted, a selector that selects an output packet to output, from among a plurality of conflict packets having an identical outputting unit as a destination, based on the first priority counter value set in each conflict packet, the plurality of conflict packets being among a plurality of packets inputted to the plurality of inputting units, and a processing unit that sets a second priority counter value in each of unselected packets that have failed to be selected as the output packet from among the plurality of conflict packets, wherein the second priority value is calculated by updating the first priority counter value set in each of the unselected packets, based on weighting information in accordance with a packet size of the selected output packet, so that next selection of the output packet from among the plurality of conflict packets is performed based on the calculated second priority counter values set in the plurality of conflict packets; and a plurality of calculation nodes connected communicatively via the communication control device, wherein the selector includes a conflict packet specifier that specifies the conflict packets based on destination information obtained from the plurality of packets respectively, and an output packet selector that selects the output packet, from among the conflict packets specified by the conflict packet specifier, based on the first priority counter values set in the conflicts packets, and wherein the second priority counter value is calculated by adding a value obtained in proportion of the packet size of the selected output packet, to each of the first priority count values set in the unselected packets.

5. A communication control method of a communication control device including a plurality of inputting units to which a packet having a first priority counter value set therein is inputted and a plurality of outputting units that outputs the packet, the communication control method comprising: selecting, by the communication control device, an output packet to output, from among a plurality of conflict packets having an identical outputting unit as a destination, based on the first priority counter value set in each conflict packet, the plurality of conflict packets being among a plurality of packets inputted to the plurality of inputting units; and setting a second priority counter value in each of unselected packets that have failed to be selected as the output packet from among the plurality of conflict packets, the second priority counter value being calculated by updating the first priority counter value set in each of the unselected packets, based on weighting information in accordance with a packet size of the selected output packet, so that next selection of the output packet from among the plurality of conflict packets is performed based on the calculated second priority counter values set in the plurality of conflict packets, wherein the selecting includes specifying the conflict packets based on destination information obtained from the plurality of packets respectively, and selecting the output packet, from among the specified conflict packets, based on the first priority counter values set in the conflicts packets, and wherein the second priority counter value is calculated by adding a value obtained in proportion of the packet size of the selected output packet, to each of the first priority count values set in the unselected packets.

* * * * *